(12) United States Patent
Hermann et al.

(10) Patent No.: US 8,751,104 B2
(45) Date of Patent: Jun. 10, 2014

(54) SYSTEM AND METHOD FOR UPDATING VEHICLE COMPUTING PLATFORM CONFIGURATION INFORMATION

(75) Inventors: Thomas Hermann, Troy, MI (US); Timothy P. Curtis, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 13/160,797

(22) Filed: Jun. 15, 2011

(65) Prior Publication Data

US 2011/0238237 A1 Sep. 29, 2011

Related U.S. Application Data

(63) Continuation of application No. 11/742,091, filed on Apr. 30, 2007, now Pat. No. 7,979,177.

(51) Int. Cl.
*B60R 25/10* (2013.01)

(52) U.S. Cl.
USPC ..... 701/36; 340/426.1; 340/429; 340/426.11; 340/5.1; 340/5.31; 340/5.6; 340/5.8

(58) Field of Classification Search
USPC .......... 340/988–996, 425–490; 701/400–465; 131/988–996, 425–490
See application file for complete search history.

(56) References Cited

U.S. PATENT DOCUMENTS

| | | | |
|---|---|---|---|
| 4,754,255 A * | 6/1988 | Sanders et al. | 307/10.4 |
| 5,525,977 A * | 6/1996 | Suman | 340/4.4 |
| 5,808,374 A * | 9/1998 | Miller et al. | 307/10.1 |
| 6,148,212 A * | 11/2000 | Park et al. | 455/456.1 |
| 6,266,589 B1 * | 7/2001 | Boies et al. | 701/36 |
| 6,323,761 B1 * | 11/2001 | Son | 340/426.35 |
| 6,445,084 B1 * | 9/2002 | Daiss et al. | 307/10.2 |
| 6,532,298 B1 | 3/2003 | Cambier et al. | |
| 6,549,115 B1 * | 4/2003 | Daiss et al. | 340/5.31 |
| 6,711,474 B1 * | 3/2004 | Treyz et al. | 701/1 |
| 6,759,943 B2 * | 7/2004 | Lucy et al. | 340/5.72 |
| 6,830,123 B2 * | 12/2004 | Ohki et al. | 180/326 |
| 6,999,858 B2 * | 2/2006 | Walker et al. | 701/1 |
| 7,038,596 B2 * | 5/2006 | Nakajima | 340/905 |
| 7,085,635 B2 * | 8/2006 | Boman et al. | 701/36 |
| 7,170,400 B2 * | 1/2007 | Cowelchuk et al. | 340/438 |
| 7,419,027 B2 * | 9/2008 | Bihya | 180/271 |
| 7,454,545 B2 * | 11/2008 | Kohno et al. | 710/72 |
| 7,483,772 B2 * | 1/2009 | Oesterling et al. | 701/2 |
| 7,564,342 B2 * | 7/2009 | Klein | 340/425.5 |
| 7,685,162 B2 * | 3/2010 | Heider et al. | 707/802 |
| 7,801,507 B2 * | 9/2010 | Benco et al. | 455/410 |
| 7,979,177 B2 * | 7/2011 | Hermann et al. | 701/29.6 |
| 8,050,815 B2 * | 11/2011 | Perry et al. | 701/31.5 |
| 8,577,548 B2 * | 11/2013 | Miller et al. | 701/36 |
| 2002/0049538 A1 * | 4/2002 | Knapton et al. | 701/216 |
| 2002/0096572 A1 * | 7/2002 | Chene et al. | 236/62 |

(Continued)

*Primary Examiner* — Jonathan M Dager
(74) *Attorney, Agent, or Firm* — Frank A. MacKenzie; Brooks Kushman P.C.

(57) ABSTRACT

A vehicle includes a computing platform configured with first configuration information, an identification module that receives driver identification information and determines whether to enable the computing platform based on the identification information, and a communication module that establishes communications between the computing platform and an off-vehicle information store storing second configuration information if the computing platform is enabled. The vehicle also includes an update module that updates the computing platform with the second configuration information if the second configuration information is different than the first configuration information.

3 Claims, 3 Drawing Sheets

(56) References Cited

U.S. PATENT DOCUMENTS

| | | | | |
|---|---|---|---|---|
| 2002/0135466 | A1* | 9/2002 | Bunyan | 340/426 |
| 2003/0078709 | A1* | 4/2003 | Yester et al. | 701/36 |
| 2003/0181822 | A1* | 9/2003 | Victor | 600/558 |
| 2004/0010358 | A1* | 1/2004 | Oesterling et al. | 701/49 |
| 2004/0019416 | A1* | 1/2004 | Chen et al. | 701/36 |
| 2004/0085189 | A1* | 5/2004 | Nagai et al. | 340/5.72 |
| 2004/0092253 | A1* | 5/2004 | Simonds et al. | 455/414.2 |
| 2004/0124968 | A1* | 7/2004 | Inada et al. | 340/5.72 |
| 2004/0158373 | A1* | 8/2004 | Nakaya | 701/35 |
| 2004/0225557 | A1* | 11/2004 | Phelan et al. | 705/11 |
| 2005/0030184 | A1* | 2/2005 | Victor | 340/576 |
| 2005/0134477 | A1* | 6/2005 | Ghabra et al. | 340/825.72 |
| 2005/0137757 | A1* | 6/2005 | Phelan et al. | 701/1 |
| 2005/0159853 | A1* | 7/2005 | Takahashi et al. | 701/1 |
| 2005/0182538 | A1* | 8/2005 | Phelan et al. | 701/35 |
| 2005/0216144 | A1* | 9/2005 | Baldassa | 701/24 |
| 2005/0237150 | A1* | 10/2005 | Sun et al. | 340/5.52 |
| 2005/0288837 | A1* | 12/2005 | Wiegand et al. | 701/36 |
| 2006/0001523 | A1* | 1/2006 | Underdahl et al. | 340/5.64 |
| 2006/0047419 | A1* | 3/2006 | Diendorf et al. | 701/208 |
| 2006/0049962 | A1* | 3/2006 | Okada | 340/901 |
| 2006/0106515 | A1* | 5/2006 | Phelan et al. | 701/35 |
| 2006/0111817 | A1* | 5/2006 | Phelan et al. | 701/1 |
| 2006/0122749 | A1* | 6/2006 | Phelan et al. | 701/35 |
| 2006/0195483 | A1* | 8/2006 | Heider et al. | 707/104.1 |
| 2006/0200008 | A1* | 9/2006 | Moore-Ede | 600/300 |
| 2006/0212195 | A1* | 9/2006 | Veith et al. | 701/35 |
| 2007/0082706 | A1* | 4/2007 | Campbell et al. | 455/563 |
| 2007/0139170 | A1* | 6/2007 | Higuchi | 340/426.1 |
| 2007/0158128 | A1* | 7/2007 | Gratz et al. | 180/287 |
| 2007/0200663 | A1* | 8/2007 | White et al. | 340/5.31 |
| 2008/0077298 | A1* | 3/2008 | Hattori et al. | 701/49 |
| 2008/0228358 | A1* | 9/2008 | Wang et al. | 701/49 |
| 2008/0245598 | A1* | 10/2008 | Gratz et al. | 180/287 |
| 2008/0269979 | A1 | 10/2008 | Hermann et al. | |
| 2008/0319602 | A1* | 12/2008 | McClellan et al. | 701/33 |
| 2009/0024273 | A1* | 1/2009 | Follmer et al. | 701/35 |
| 2009/0027177 | A1* | 1/2009 | Hodder | 340/426.12 |
| 2009/0030770 | A1* | 1/2009 | Hersh et al. | 705/9 |
| 2009/0069954 | A1* | 3/2009 | Aladesuyi | 701/2 |
| 2009/0079555 | A1* | 3/2009 | Aguirre De Carcer et al. | 340/441 |
| 2009/0082928 | A1 | 3/2009 | Witkowski et al. | |
| 2009/0189736 | A1* | 7/2009 | Hayashi | 340/5.81 |
| 2009/0195370 | A1* | 8/2009 | Huffman et al. | 340/426.13 |
| 2010/0004818 | A1* | 1/2010 | Phelan | 701/35 |
| 2010/0161171 | A1* | 6/2010 | Valentine et al. | 701/33 |

\* cited by examiner

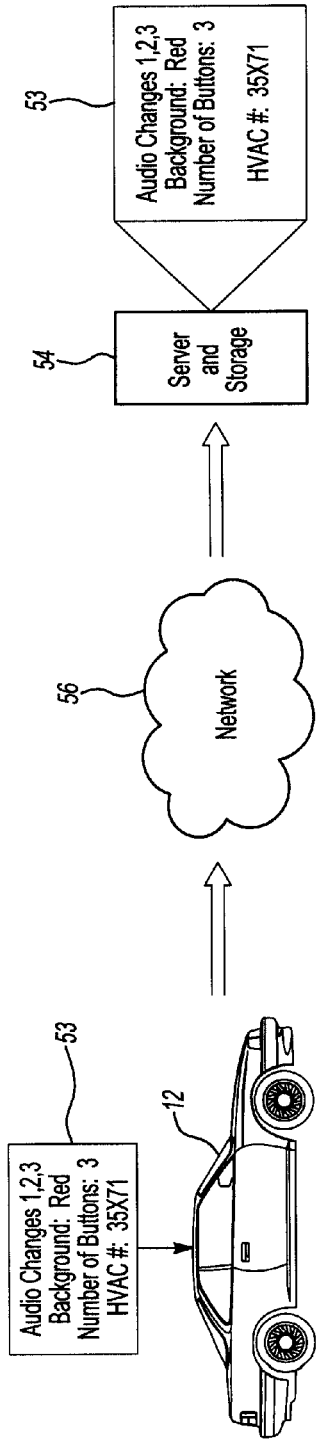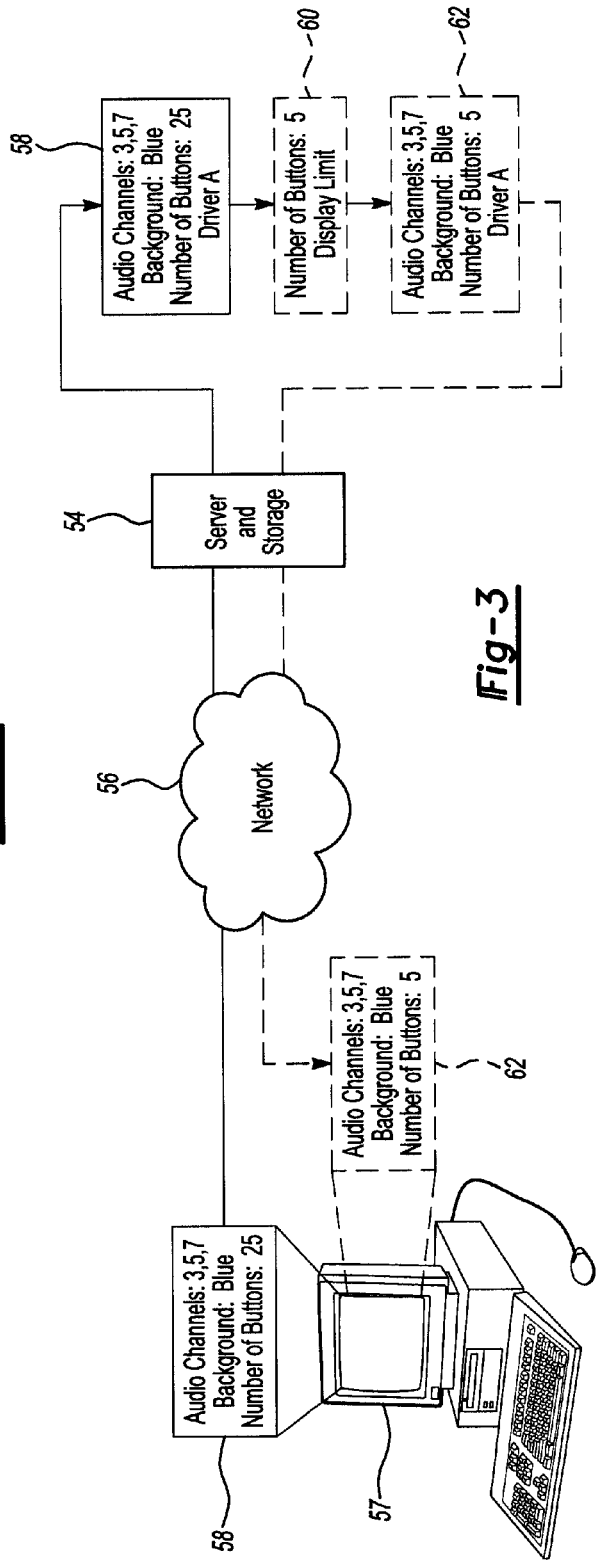

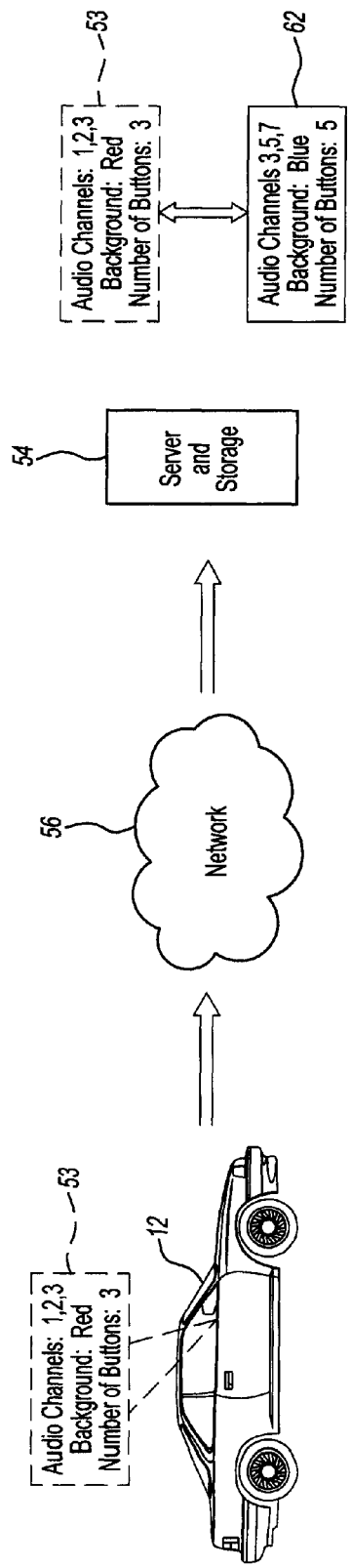
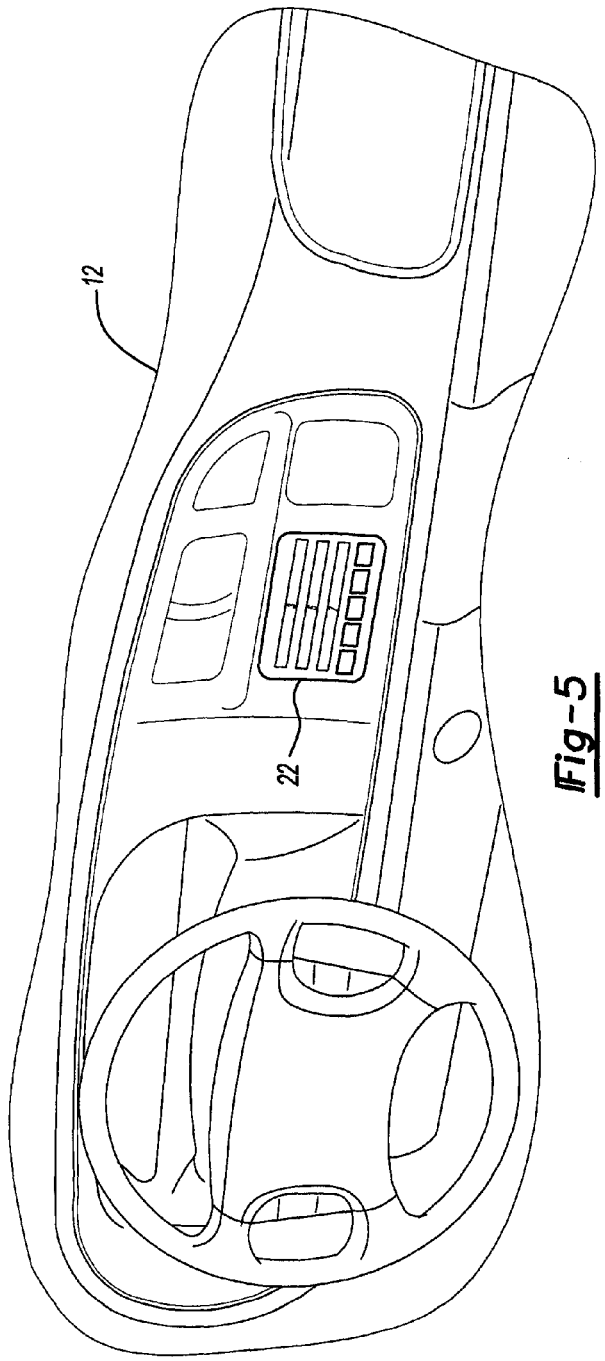
Fig-4
Fig-5

SYSTEM AND METHOD FOR UPDATING VEHICLE COMPUTING PLATFORM CONFIGURATION INFORMATION

CROSS-REFERENCE TO RELATED APPLICATION

This application is a continuation of application Ser. No. 11/742,091, filed Apr. 30, 2007, the contents of which are hereby incorporated by reference.

TECHNICAL FIELD

This disclosure relates to systems and methods for updating vehicle computing platform configuration information.

BACKGROUND

A vehicle may have a computer that communicates with the internet. Sensitive information may reside with the computer. Unauthorized use of the vehicle may lead to unauthorized access of the information.

SUMMARY

First configuration information of a vehicle computing platform may be updated by determining whether to enable the computing platform based on driver identification information, establishing communications between the computing platform and an off-vehicle information store storing second configuration information if the computing platform is enabled, and updating the computing platform with the second configuration information if the second configuration information is different than the first configuration information.

BRIEF DESCRIPTION OF THE DRAWINGS

FIG. 2 is an illustration of the vehicle, a network, and a remote server for storing configuration information and shows the vehicle communicating default configuration information to the remote server via the network.

FIG. 3 is an illustration of an update terminal, a network, and the remote server and shows updated configuration information being submitted to the remote server via the network, modified by the remote server in accordance with a policy, and returned to the update terminal via the network.

FIG. 4 is an illustration of the vehicle, network, and remote server of FIG. 2 and shows that at vehicle start-up, the vehicle and remote server cooperate to determine whether the remote server has updated configuration information.

FIG. 5 is a perspective view of the dash panel of the vehicle of FIG. 1 and shows a monitor with the updated configuration information.

DETAILED DESCRIPTION

Figure 1:
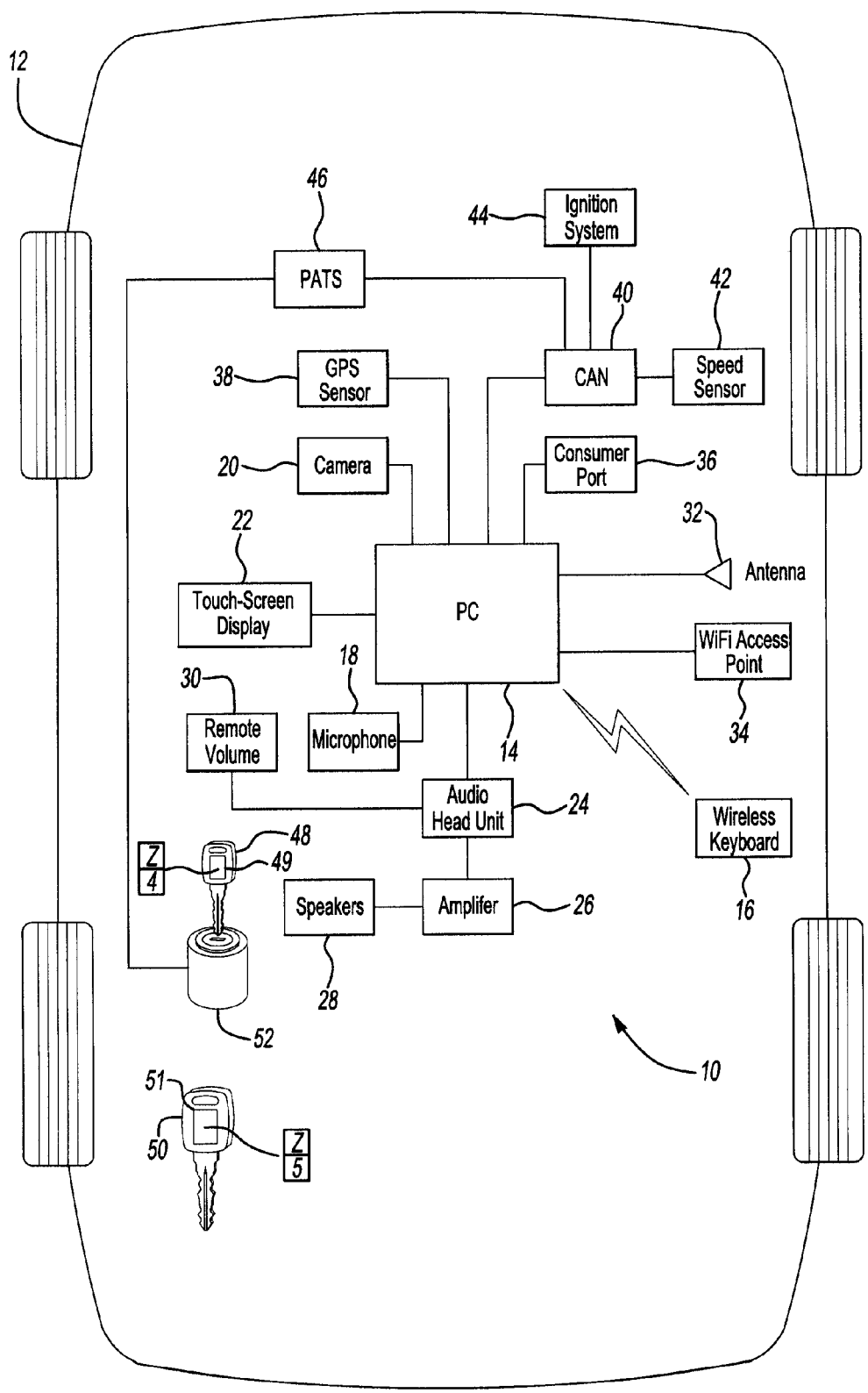
FIG. 1 is a block diagram of a computer system for a vehicle in accordance with an embodiment of the invention and shows the communicative relationship between a central processor, passive anti-theft system, and ignition system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In some embodiments, a two level authentication system in which the second level is optional based on customer preference and level of security is provided. An immobilizer transponder, passive keyless entry transponder, or remote keyless entry transmitter may be used to authenticate the holder of a token as a valid user for the system. In addition, an optional pin code may be used for enhanced authentication. Keyboard entry of a pin number may be from radio preset selection buttons or other convenient buttons provided for this or other combined features. Such token/pin authentication enables the appropriate function, features, content, and data for a valid user.

FIG. 1 is a block diagram of integrated system 10 of vehicle 12. Processor 14 provides an occupant of vehicle 12 with a common access point to various vehicle components and data. Processor 14 receives input from wireless keyboard 16, microphone 18, and camera 20. Processor 14 also receives input via display screen 22, e.g., touchscreen, and displays various information via display screen 22. Processor 14 is also connected with the sound system for vehicle 12. The sound system includes audio head unit 24, amplifier 26, and speakers 28. The volume of speakers 28 may be remotely controlled with remote volume switch 30. Processor 14 receives signals via antenna 32 and transmits and receives wireless data via transceiver 34.

Consumer port 36, e.g., USB port, permits an occupant to exchange information with vehicle 12. GPS sensor 38, together with processor 14, determines the current location of vehicle 12.

Car area network 40 is connected with processor 14, speed sensor 42, ignition system 44, and passive anti-theft system 46. Speed sensor 42 determines, in conventional fashion, the speed of vehicle 12. In alternative embodiments, some or all of the elements connected directly with processor 14 may be connected with car area network 40 and thus communicate with processor 14 via car area network 40.

Passive anti-theft system 46 prevents unauthorized use of vehicle 12 and processor 14. As described below, passive anti-theft system 46 may prevent ignition system 44 from starting vehicle 12 and may also prevent the operation of processor 14.

Keys 48, 50 include embedded identifying information 49, 51 respectively. Passive anti-theft system 46 uses identifying information 49, 51 to determine whether keys 48, 50 are associated with vehicle 12 and to distinguish between keys 48, 50.

If key 48 is inserted into key slot 52, key slot 52 senses identifying information 49. Identifying information 49 includes a vehicle identifier, e.g., "Z", that indicates key 48 is for use with vehicle 12. This vehicle identifier, e.g., "Z", is shared between keys 48, 50. That is, in this example, identifying information 51 of key 50 will also include the vehicle identifier "Z". On the basis of the vehicle identifier, passive anti-theft system 46 determines that key 48, or key 50, is for use with vehicle 12. Identifying information 49 also includes a driver identifier, e.g., "4", that indicates key 48 is different from key 50. This driver identifier, e.g., "4", is not shared between keys 48, 50. That is, in this example, identifying information 51 of key 50 will include a different driver identifier, e.g., "5". On the basis of the driver identifier, passive anti-theft system 46 distinguishes between key 48 and key 50 and thus distinguishes between Driver A who normally uses key 48 and Driver B who normally uses key 50. As described below, if processor 14 is informed as to which driver is to drive vehicle 12, processor 14 can check to see if Driver A or Driver B has updated their respective configuration information and, if so, update system 10 with any updated configuration information.

If key 48 is inserted into key slot 52, passive anti-theft system 46 determines that key 48 is associated with a particular driver, e.g., Driver A, and may be used to start ignition system 44. If, instead, key 50 is inserted in key slot 52, passive anti-theft system 46 determines that key 50 is associated with a different particular driver, e.g., Driver B, and may be used to start ignition system 44.

If key 48 is inserted in key slot 52, passive anti-theft system 46 enables processor 14 such that Driver A will have use of processor 14 and access to data on processor 14 specific to Driver A. If, instead, key 50 is inserted in key slot 52, passive anti-theft system 46 enables processor 14 such that Driver B will have use of processor 14 and access to data on processor 14 specific to Driver B.

Identifying information 49, 51 need not be embedded with keys 48, 50. In some embodiments, identifying information 49, 51 may be provided by key fobs or other devices. In some embodiments, additional identifying information may be required prior to enabling ignition system 44 or processor 14. For example, a driver may need to input an additional identifying code via touch display 22.

FIG. 2 is an illustration of vehicle 12, remote location 54, and network 56. During assembly, processor 14 (FIG. 1) is loaded with factory set configuration information 53 which determines, inter alia, the appearance and functionality of display screen 22. Configuration information 53 is uploaded and stored at remote location 54 via network 56. In the example of FIG. 2, configuration information 53 specifies audio channels 1, 2, and 3, a red background, and three (3) buttons for display 22. Configuration information 53 also includes a part number for a component of vehicle 12, e.g., HVAC#: 35X71. As described below, this component information may be used to verify that requested configuration information is directed to an authorized vehicle.

FIG. 3 is an illustration of update terminal 57, remote location 54, and network 56. In the example of FIG. 3, Driver A accesses remote location 54 via network 56 and submits updated configuration information 58 including audio channel, background, and number of button information for display 22. Remote location 54 checks to see whether updated configuration information 58 complies with policy 60 regarding the number of buttons for display 22. In the example of FIG. 3, policy 60 permits a maximum of 5 buttons for display 22. If updated configuration information 58 violates policy 60, remote location 54 will modify updated configuration information 58 such that it complies with policy 60. In the example of FIG. 3, updated configuration information specifies audio channels 3, 5, and 7, a blue background, and twenty-five (25) buttons for display 22. Policy 60, however, limits the number of buttons to five (5). Remote location 54 will modify updated configuration information 58 such that it includes only five (5) buttons. Modified configuration information 62 will be stored at remote location 54 and returned to Driver A via network 56.

In alternative embodiments, remote location 54 may reject updated configuration information 58 if it does not comply with policy 60. As such, remote location 54 is able to control the configuration information associated with processor 14 and display 22.

FIG. 4 is an illustration of vehicle 12, remote location 54, and network 56. Upon the next authorized start-up of vehicle 12 by Driver A, following the process described with respect to FIG. 3, processor 14 will communicate with remote location 54, via wireless access point 34 (FIG. 1), through network 56 to determine whether factory installed configuration information 53 is to be updated. Processor 14 will request from remote location 54 an indicator as to whether the configuration information has changed, and, if so, processor 14 will download modified configuration information 62 and configure processor 14 and display 22 based on modified configuration information 62 during the use of vehicle 12 by Driver A.

In the absence of any update to configuration information 53 by Driver B, upon the next authorized start-up of vehicle 12 by Driver B, processor 14 will reconfigure processor 14 and display 22 based on configuration information 53 during the use of vehicle 12 by Driver B.

In some embodiments, prior to the download of updated configuration information, remote location 54 may request the part number of a vehicle component, e.g., HVAC#: 35X71, to confirm that the vehicle requesting the configuration information is authorized to do so. Remote location 54 may compare the received vehicle component number and compare it to that stored and uploaded by the factory. If the numbers match, remote location 54 may allow the download of any updated configuration information to occur. If the numbers do not match, remote location 54 may deny the request to download any updated configuration information.

In some embodiments, driver behavior may be used to determine whether to prevent access or disable some or all of the functionality of system 10. For example, speed sensor 42 may indicate that the vehicle speed exceeds all legal limits, e.g., 100 m.p.h., suggesting unauthorized use of vehicle 12. Under such circumstances, passive anti-theft system may disable some or all of the functionality of processor 14 to protect information residing in processor 14. It is contemplated that other techniques may be used to monitor driver behavior, e.g., frequency of stop and start, intensity of breaking or acceleration, etc.

FIG. 5 is a perspective view of the dash panel of vehicle 12 and shows display 22 with modified configuration information 62, e.g., display unit 22 is shown with audio channels 3, 5, and 7 and five (5) buttons.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a computing platform configured with first configuration information;
 an identification module configured to (i) receive from a token identification information for a driver, (ii) selectively enable the computing platform such that the first configuration information is accessible to the driver based on the identification information, (ii) monitor subsequent driving behavior, and (ii) selectively prevent access to the computing platform, if enabled, based on the driving behavior without disabling the vehicle to protect configuration information on the computing platform;
 a communication module configured to, if the computing platform is enabled, establish communications between the computing platform and an off-vehicle information store remote from the token storing second configuration information; and an update module configured to update the computing platform with the second configuration information if the second configuration information is different than the first configuration information.

2. A method for updating first configuration information of a vehicle computing platform comprising:

receiving from a token identification information for a driver;

selectively enabling the computing platform such that the first configuration information is accessible to the driver based on the identification information;

establishing communications between the computing platform and an off-vehicle information store remote from the token storing second configuration information if the computing platform is enabled;

updating the computing platform with the second configuration information if the second configuration information is different than the first configuration information;

monitoring subsequent driving behavior; and selectively preventing access to the computing platform, if enabled, based on the driving behavior without disabling the vehicle to protect configuration information on the computing platform.

3. A method for updating first configuration information of a vehicle computing platform comprising:

selectively enabling the computing platform such that the first configuration information is accessible to a driver based on identification information from a token;

establishing communications between the computing platform and an off-vehicle information store remote from the token storing second configuration information if the computing platform is enabled;

updating the computing platform with the second configuration information if the second configuration information is different than the first configuration information;

monitoring subsequent driving behavior; and selectively preventing access to the computing platform, if enabled, based on the driving behavior without disabling the vehicle to protect configuration information on the computing platform.

* * * * *